2,475,147

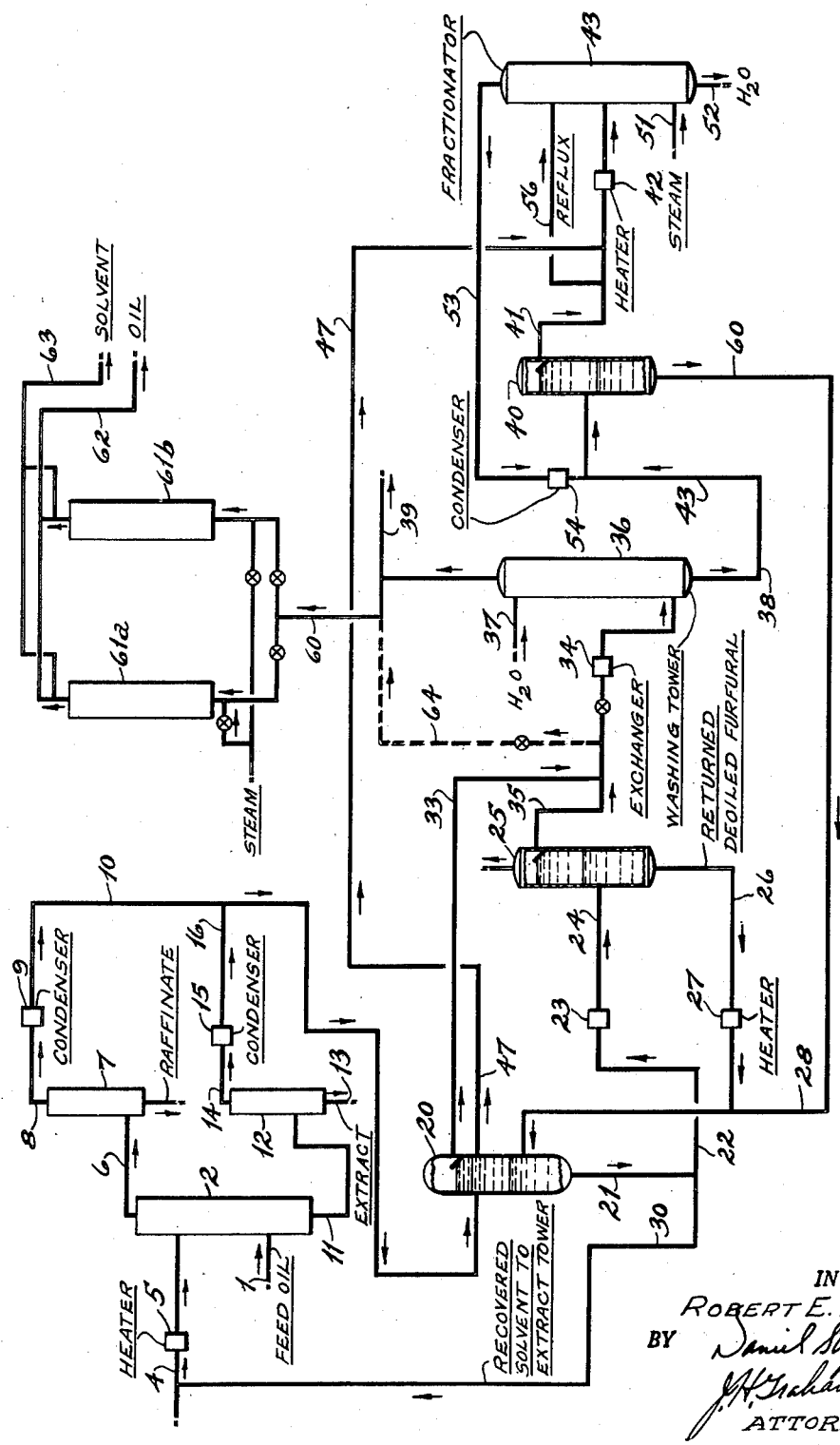
July 5, 1949. R. E. MANLEY 2,475,147
SOLVENT REFINING OF LIGHT OILS
Filed Oct. 9, 1947
INVENTOR.
ROBERT E. MANLEY
BY
ATTORNEYS Patented July 5, 1949

UNITED STATES PATENT OFFICE 2,475,147

SOLVENT REFINING OF LIGHT OILS

Robert E. Manley, Yonkers, N. Y., assignor to The Texas Company, New York, N. Y., a corporation of Delaware Application October 9, 1947, Serial No. 778,833

6 Claims. (Cl. 196—14.48)

This invention relates to a method of effecting extraction of oil with a solvent liquid which is at least partially miscible with water at ordinary temperatures and particularly relates to the extraction of oil containing a minor proportion of constituents whose true boiling point is lower than that of the solvent.

The invention is particularly concerned with a method of recovering the solvent for reuse with a minimum amount of fractional distillation and yet avoiding excessive build-up of low boiling constituents of the oil in the solvent.

In accordance with the invention, a feed oil, such as kerosene or low boiling gas oil, is extracted with a selective solvent such as furfural in the presence of a small amount of water, or, if desired, in the substantial absence of water, and under conditions effective to form extract and raffinate phases respectively. The raffinate phase comprises non-aromatic or relatively insoluble constituents of the oil mixed with a small proportion of the solvent. The extract comprises the relatively aromatic and more soluble constituents of the oil dissolved in the main body of solvent.

The extract and raffinate phases are separately subjected to fractional distillation with the aid of steam, the distillation being azeotropic or partially azeotropic in character so as to strip the solvent completely or substantially completely from the oil while avoiding excessive carryover of low boiling constituents of the oil in the distillate. The resulting distillates may be separately condensed or condensed in the presence of each other. The condensed liquid comprising solvent and relatively small amounts of oil and water is passed to a primary settling zone wherein separation into oil-rich, water-rich and solvent-rich liquid layers occurs. Liquid streams are continuously withdrawn from these separate primary liquid layers for further treatment.

The major portion of the withdrawn solvent-rich liquid is recycled directly to the extraction zone while a minor portion thereof is cooled to a temperature substantially below normal room temperature and passed to a secondary settling zone wherein it separates into oil-rich and solvent-rich layers. The secondary solvent liquid is withdrawn and recycled to the solvent-rich liquid layer in the primary settling zone.

The secondary oil-rich liquid, as well as the primary oil-rich liquid, is conducted to a washing zone wherein it is subjected to contact with a relatively large proportion of water at a temperature sufficiently elevated to effect extract by the water of residual solvent remaining in the secondary oil. The resulting washed oil can be discharged from the system without further treatment. It is contemplated, however, that any traces of residual solvent remaining in the washed oil may be removed by subjecting the washed oil to contact with a solid adsorbent agent such as bauxite, fuller's earth, silica gel and activated carbon.

The resulting solution of residual solvent in water is subjected to settling in a tertiary settling zone maintained at a lower temperature, for example, in the range of about 80 to 120° F. or at a temperature not substantially above atmospheric. As a result of such settling, separation into water-rich and solvent-rich layers occurs. The tertiary solvent-rich liquid is recycled to the primary settling zone, while the tertiary water-rich liquid, as well as the primary water-rich liquid, is passed to a secondary fractionating zone wherein the wet solvent is concentrated, and from which solvent-free water is discharged as a residual liquid fraction. The secondary distillate of increased solvent content is condensed and recycled to the tertiary settling zone.

In order to describe the invention in more detail, reference will be made to the flow diagram illustrated in the accompanying drawing.

The flow will be described with reference to the production of Diesel fuel by the treatment of a gas oil discharged from the catalytic cracking of petroleum oil. The feed gas oil has an A. P. I. gravity of about 29 and a cetane number of about 32. It has an A. S. T. M. boiling range as follows:

| | |
|---|---|
| I. B. P. | 430° F. |
| 10% | 470° F. |
| 20% | 480° F. |
| 50% | 500° F. |
| 90% | 560° F. |
| E. P. | 620° F. |

As indicated in the drawing, the feed oil is conducted from a source not shown through a pipe 1 to the lower portion of a primary extraction tower 2 of conventional type.

The feed oil rises through the tower countercurrently to a stream of solvent liquid comprising furfural introduced to the upper portion of the tower through a pipe 4 and heater 5. The source of the solvent will be discussed later. In the usual case, the solvent entering the tower 2 will contain about 3% water and about 10 to 15% oil as a result of previous use in the process. The solvent is introduced to the tower in the proportion of about one volume of solvent to one volume of feed oil.

The temperature of the entering streams of oil and solvent are regulated to effect the maximum downflow of solvent through the extraction zone. It may be advantageous to maintain a lower temperature at the top than at the bottom of the tower, the object being to decrease the carry-over of dissolved solvent in the raffinate phase. For example, the temperature at the top may be about 100° F. while that at the bottom is about 130 to 150° F.

Under these conditions, extract and raffinate phases form, the raffinate phase comprising oil of about 45 to 60 cetane number and amounting to from 60 to 80% by volume of the feed oil (solvent-free basis).

The raffinate oil in which is dissolved a small portion of the solvent liquid is continuously removed from the tower through a pipe 6 to a raffinate oil stripper 7 wherein solvent is distilled from the raffinate oil.

The raffinate oil is discharged through a pipe 8.

The resulting distillate comprises a mixture of furfural, water and oil, the oil amounting to from about 2 to 3% based on the raffinate oil. This distillate is removed through a pipe 8, condenser 9 and pipe 10 leading to a primary settling chamber 20.

Likewise, the extract phase is continuously drawn off through a pipe 11 to a stripper 12 operating in a manner similar to that of the stripper 7. Solvent-free extract oil is discharged through a pipe 13, and this oil is characterized by having an A. P. I. gravity of about 10 to 12 and a cetane number of about 4 to 10, containing as much as 70 to 80% aromatic hydrocarbons.

The distillate comprising furfural, water and a small proportion of oil is removed through a pipe 14, condenser 15 and pipe 16 communicating with the previously mentioned pipe 10.

Thus, both distillates are conducted to the primary settling zone 20 which is maintained at a temperature of about 100 to 150° F. The condensed distillates separate into three layers in the settling zone, namely, oil-rich, water-rich and solvent-rich layers. The composition of the oil-rich layer and the character of the oil are approximately as follows:

*Composition*

| | |
|---|---|
| Per cent oil | 93.9 |
| Per cent solvent | 6.0 |
| Per cent water | 0.1 |

*Character of the oil*

| | |
|---|---|
| A. P. I. gravity | 40 |
| Refractive index | 1.46 |
| A. S. T. M. distillation: | |
| I. B. P. | 250 |
| 10% | 320 |
| 50% | 410 |
| 90% | 450 |
| E. P. | 500 |

The solvent-rich liquid initially separating from the condensate in the primary settling zone retains in excess of about 10 to 15% oil, and it is therefore desirable to reduce this concentration of light oil in the solvent prior to returning the solvent to the extraction zone.

Therefore, in accordance with this invention, a minor proportion of the solvent layer drawn off through pipe 21 is diverted through pipe 22 to a cooler 23 wherein the stream is cooled to about 40° F. or to a temperature in the range of 30 to 60° F. and sufficient to effect displacement of the required amount of oil from the solvent.

The resulting cold stream is conducted through pipe 24 to a secondary settling zone 25 maintained at about 30 to 60° F. wherein secondary oil-rich and solvent-rich liquid layers occur. The secondary solvent-rich liquid substantially reduced in oil content is drawn off through pipe 26 and heater 27 wherein it is raised to a temperature of about 100° F. or to the temperature prevailing within the primary settling zone. The reheated stream is then returned to the lower portion of the primary settling zone as indicated. The continuous recycling of this secondary solvent stream results in the continuous removal of oil from the solvent layer in the primary settling zone, so that the oil content of the major portion of the recovered solvent flowing through pipe 30 is maintained not in excess of about 10 to 15% by volume of the solvent, or at any predetermined amount that may be desired. In other words, the oil content of the solvent stream being recycled through pipe 30 to extraction tower 2 is maintained at a predetermined value by diverting the proper proportion of solvent through the cooler 23, secondary settler 25, heater 27 and return pipe 28.

The primary oil-rich liquid accumulating in the upper portion of the primary settler 20 is drawn off through a pipe 33 to an exchanger 34 through which it is passed together with the secondary oil-rich liquid removed from the secondary settler through pipe 35. The combined liquid is passed from the exchanger into the lower portion of a washing tower 36. Water which may be derived from a subsequent point in the system, such as from pipe 52 to which reference will be made later, is introduced through a pipe 37 to the upper portion of the tower in the proportion of about two volumes per volume of oil.

The temperatures of the entering streams of water and oil are adjusted so as to maintain a temperature of about 140 to 150° F. in the tower, and thus sufficient to effect solution, in the water, of residual solvent retained in the entering oil. The water and oil are thus passed in countercurrent contact. The resulting washed oil substantially free from solvent or containing only traces thereof is discharged from the tower through a pipe 39 while the resulting solution of solvent in water is removed from the bottom of the tower through a pipe 38.

The pipe 38 discharges into a tertiary settling zone 40 maintained at a temperature of about 80 to 120° F., and wherein separation into water-rich and solvent-rich liquid layers occurs. The tertiary water-rich liquid contains about 35% furfural and 65% water, and is drawn off through a pipe 41 to a heater 42 from which it is conducted to a secondary fractionator 43.

Primary water-rich liquid is also drawn from the primary settling zone 20 through pipe 47 to the heater 42 and thereafter introduced to the fractionating zone 43.

Steam is introduced to the fractionator through pipe 51 so as to distill therefrom a distillate of enriched solvent content leaving a residual liquid comprising substantially solvent-free water. The latter is discharged through pipe 52.

The secondary distillate comprising about 65% furfural and 35% water is removed through pipe 53 and conducted to the condenser 54 for return to the tertiary settling zone.

As indicated in the drawing, some of the tertiary water-rich liquid may be diverted to pipe 55 and branch pipe 56 as reflux to the fractionator 43.

The tertiary solvent-rich liquid comprising about 90-95% furfural and 5-10% water is removed through pipe 69 which communicates with pipe 28, and by which it is returned to the primary settling zone.

In accordance with this invention, the secondary oil removed from the washing tower through pipe 39 may be subjected to a further treatment with a suitable solid adsorbent material. In such case, the washed oil is passed through a pipe 60 to either one of two adjacent treating vessels 61A and 61B, which vessels are operated alternatively. Thus, the washed oil is caused to flow in liquid phase through one vessel packed with the solid adsorbent material for a period of time until the adsorbent becomes saturated with a solvent. At this point, the oil stream is switched to the adjacent vessel. Meanwhile, the offstream vessel is subjected to regeneration by flowing steam or hot gas therethrough.

The purpose of this contacting treatment is to remove traces of solvent remaining in the secondary oil. The solvent may be present to the extent of 15% or less of the oil by weight.

The oil, after contact treatment, is discharged through a pipe 62.

The regenerating gas in which the adsorbed solvent is entrained is removed from the contacting unit through a pipe 63 and passed to suitable recovery apparatus not shown for the purpose of recovering solvent from the gas.

The contact treatment of the oil is advantageously carried out at a temperature of about 80-130° F.

If desired, the adsorbed solvent may be vaporized from the adsorbent by application of heat to the adsorbent material through heating coils imbedded in the contact bed.

While mention has been made of subjecting the oil-rich liquid from the primary and secondary settling zones to washing with water, nevertheless, it is contemplated that under certain conditions, the washing step may be omitted. Instead of washing, the oil may be passed directly from pipes 33 and 35 through a pipe 64 communicating with pipe 60 through which the oil-rich liquid is charged directly to the aforesaid contacting vessels.

While not specifically described, nevertheless, it is contemplated that provision may be made for employing the conventional heat exchange between the various streams. The fractionators may be provided with reboiler sections.

Although the treatment of gas oil has been referred to, nevertheless, it should be understood that the process is applicable to the treatment of other types of oil, including kerosene containing small amounts of constituents having a true boiling point lower than that of the solvent used or having a boiling point approximately similar to that of the solvent. In general, the invention has application to the treatment of hydrocarbon mixtures having an A. S. T. M. boiling range of about 350 to 700° F. It is also contemplated that it has application to the treatment of oils derived from animal and vegetable sources. Specific conditions of temperature and solvent dosage may vary from those specifically mentioned, depending upon the character of feed oil and degree of fractional separation desired.

The invention is particularly concerned with the use of relatively high boiling organic solvent liquids which are miscible, at least to some extent, with water. Selective solvents other than furfural may be used, including other derivatives of the furan group and other aldehydes such as benzaldehyde, nitrobenzene, ketones, etc.

Obviously, many modifications and variations of the invention as above set forth may be made without departing from the spirit and scope thereof, and, therefore, only such limitations should be imposed as are indicated in the appended claims.

I claim:

1. In the solvent separation of feed oil containing at least a small proportion of constituents having true boiling points in the range of the solvent boiling temperature and below wherein the oil is subjected to contact in an extraction zone with an organic solvent liquid at least partially miscible with water at ordinary temperature, extract and raffinate phases are formed in the presence of water, and said phases are separately removed from the extraction zone, the steps comprising distilling from at least one of said removed phases in a primary distillation zone a distillate of solvent vapor containing small amounts of oil and water and leaving a residual liquid fraction of substantially solvent-free oil, discharging said solvent-free oil, condensing said distillate, subjecting the resulting condensate to settling in a primary settling zone, forming primary oil-rich, water-rich, and solvent-rich liquid layers respectively, separately withdrawing liquid from said primary layers, passing oil-rich liquid to a washing zone, passing water-rich liquid to a secondary distilling zone, recycling a portion of withdrawn primary solvent-rich liquid to said extraction zone, cooling another portion of said solvent-rich liquid to a temperature substantially below normal room temperature, passing the resulting cooled portion to a secondary settling zone, forming therein secondary oil-rich and solvent-rich liquid layers, separately withdrawing liquid from said secondary layers, recycling withdrawn secondary solvent-rich liquid to said primary settling zone, passing withdrawn secondary oil-rich liquid to said washing zone, contacting oil-rich liquid with a relatively large proportion of water in said washing zone under elevated temperature effective to extract residual solvent from said oil to form a secondary solution of solvent in water and a residual liquid fraction of substantially solvent-free secondary oil, discharging said secondary oil, subjecting secondary solution to settling in a tertiary settling zone at lower temperature, forming therein tertiary water-rich and solvent-rich liquid layers, separately withdrawing liquid from said tertiary layers, recycling withdrawn tertiary solvent-rich liquid to said primary settling zone, passing withdrawn tertiary water-rich liquid to said secondary distilling zone, distilling therefrom a secondary distillate of increased solvent concentration, condensing secondary distillate, passing secondary condensate to said tertiary settling zone and discharging water from said secondary distilling zone.

2. The method according to claim 1 in which the organic solvent comprises furfural.

3. The method according to claim 1 in which the primary settling zone is maintained at a temperature not less than about normal room temperature, and the secondary settling zone is maintained at about 30 to 60° F.

4. The method according to claim 1 in which sufficient primary solvent-rich liquid is diverted to said secondary zone to maintain the oil content of the total solvent returned to said extraction zone not in excess of about 10 to 15% by volume.

5. The method according to claim 1 wherein the discharged secondary oil is contacted with a solid adsorbent agent.

6. In the solvent separation of feed oil containing at least a small proportion of constituents having true boiling points in the range of the solvent boiling temperature and below wherein the oil is subjected to contact in an extraction zone with an organic solvent liquid at least partially miscible with water at ordinary temperature, extract and raffinate phases are formed in the presence of water, and said phases are separately removed from the extraction zone, the steps comprising distilling from at least one of said removed phases in a primary distillation zone a distillate of solvent vapor containing small amounts of oil and water and leaving a residual liquid fraction of substantially solvent-free oil, discharging said solvent-free oil, condensing said distillate, subjecting the resulting condensate to settling in a primary settling zone, forming primary oil-rich, water-rich, and solvent-rich liquid layers respectively, separately withdrawing liquid from said primary layers, subjecting oil-rich liquid retaining a small amount of residual solvent to contact with a solid adsorbent agent in a contacting zone under conditions effective to remove said residual solvent, discharging resulting contact treated oil, recycling a portion of withdrawn primary solvent-rich liquid to said extraction zone, cooling another portion of said solvent-rich liquid to a temperature substantially below normal room temperature, passing the resulting cooled portion to a secondary settling zone, forming therein secondary oil-rich and solvent-rich liquid layers, separately withdrawing liquid from said secondary layers, recycling withdrawn secondary solvent-rich liquid to said primary settling zone, passing withdrawn secondary oil-rich liquid to said contacting zone, separately treating said primary water-rich liquid to recover solvent therefrom, and recycling recovered solvent to said extraction zone.

ROBERT E. MANLEY.

REFERENCES CITED

The following references are of record in the file of this patent:

UNITED STATES PATENTS

| Number | Name | Date |
|---|---|---|
| 2,043,389 | Merrill | June 9, 1936 |
| 2,121,323 | Manley et al. | June 21, 1938 |
| 2,214,282 | Manley et al. | Sept. 10, 1940 |
| 2,216,933 | Atkins | Oct. 8, 1940 |
| 2,290,636 | Deanesly | July 21, 1942 |
| 2,367,671 | Dickinson et al. | Jan. 23, 1945 |
| 2,381,996 | Bloomer | Aug. 14, 1945 |
| 2,412,823 | Mayland | Dec. 17, 1946 |